US006795173B2

(12) United States Patent
Romano et al.

(10) Patent No.: US 6,795,173 B2
(45) Date of Patent: Sep. 21, 2004

(54) COUNTERFEIT DETECTION VIEWER APPARATUS FOR PAPER CURRENCY

(76) Inventors: Camille Romano, 8306 Mills Dr., #599, Miami, FL (US) 33183; Ileana Nicolau Romano, 8306 Mills Dr., #599, Miami, FL (US) 33183

(*) Notice: Subject to any disclaimer, the term of this patent is extended or adjusted under 35 U.S.C. 154(b) by 0 days.

(21) Appl. No.: 10/051,924

(22) Filed: Jan. 22, 2002

(65) Prior Publication Data

US 2003/0147065 A1 Aug. 7, 2003

(51) Int. Cl.[7] .......... G06K 9/74

(52) U.S. Cl. .......... 356/71

(58) Field of Search .......... 356/71; 382/135, 382/137; 283/72, 85

(56) References Cited

U.S. PATENT DOCUMENTS

| | | | | | |
|---|---|---|---|---|---|
| 5,444,263 | A | * | 8/1995 | Mastnak | 283/85 |
| 5,596,402 | A | * | 1/1997 | Markantes et al. | 356/71 |
| 5,607,040 | A | * | 3/1997 | Mathurin, Sr. | 356/71 |
| 5,877,852 | A | * | 3/1999 | Schilbach et al. | 356/71 |
| 5,918,960 | A | * | 7/1999 | Hopwood et al. | 356/71 |
| 5,964,336 | A | * | 10/1999 | Itako et al. | 382/135 |
| 6,470,093 | B2 | * | 10/2002 | Liang | 382/135 |

* cited by examiner

*Primary Examiner*—Zandra V. Smith

(57) ABSTRACT

The present invention provides a counterfeit detector viewer having a detection opening for receiving documents such as paper currency to be inspected. The device uses a UV light fixture mounted in the housing for projecting UV light rays toward the detection opening and the paper currency to be inspected. The device also includes a magnifying viewing glass for viewing the documents to be inspected. A slide out tray in the housing guides the currency to the UV lamp and is removable for replacing the UV lamp. The device further includes a reflector mounted within the UV light fixture to reflect the UV light rays toward the detection opening and the currency. The reflector is made of silverized plastic, polished metal, a reflective metallic finish or a pointed reflective finish. The UV lamp may be powered by batteries or an electrical cord and plug for receiving electrical current. The counterfeit detection viewer apparatus is made of plastic or lightweight metal.

11 Claims, 6 Drawing Sheets

COUNTERFEIT DETECTION VIEWER APPARATUS FOR PAPER CURRENCY

FIELD OF THE INVENTION

This invention relates to an improved counterfeit detection viewer apparatus for the detection of counterfeit paper currency and other documents. More particularly, it relates to an apparatus for identifying instantaneously the security markings of valid paper currency and other documents by using ultra violet fluorescent lighting.

BACKGROUND OF THE INVENTION

Counterfeit detector pens are helpful detecting counterfeit paper currency but are often messy to use and are limited to detecting paper currency only. There is a need for a counterfeit detector device that is simple to use, and can detect not only counterfeit paper currency but other documents including counterfeit passports, credit cards, travelers checks, I.N.S. green cards, social security cards, and the like.

It is an object of the present invention to provide a counterfeit detector device that is easy to use and able to detect counterfeit paper currency, passports, credit cards, and travelers checks and the like.

It is an object of the present to provide a device that may be used for inspecting all documents having security markings including valid paper currency, passports, credit cards, travelers checks, I.N.S. green cards, social security cards, and the like.

SUMMARY OF THE INVENTION

The present invention provides a counterfeit detector viewer having a detection opening for receiving paper currency and other documents to be inspected. The device uses a UV light fixture mounted in the housing for projecting UV light rays toward the detection opening and the paper currency to be inspected. The device also includes a magnifying viewing glass for viewing the documents to be inspected.

The device also includes a switch for activating the UV fluorescent lamp prior to inspecting the paper currency through the detection opening. A slide out tray in the housing guides the currency and other documents to the UV lamp and is removable for replacing the UV lamp.

The device further includes a reflector mounted within the UV light fixture to reflect the UV light rays toward the detection opening and the currency. The reflector is made of silverized plastic, polished metal, a reflective metallic finish or a pointed reflective finish.

The counterfeit detection apparatus for activating the UV lamp includes a switch located on the housing. The UV lamp may also be activated by an electrical cord and plug for receiving electrical current. The UV lamp has a length in range of 6 cms to 18 cms, and has a power rating of two (2) watts to twelve (12) watts. The counterfeit detection viewer apparatus is made of plastic or lightweight metal. The UV lamp may also be activated by batteries. To this end, the device can include a battery compartment for receiving one or more batteries for generating electrical current.

DETAILED DESCRIPTION OF THE PREFERRED EMBODIMENT

Figure 1:
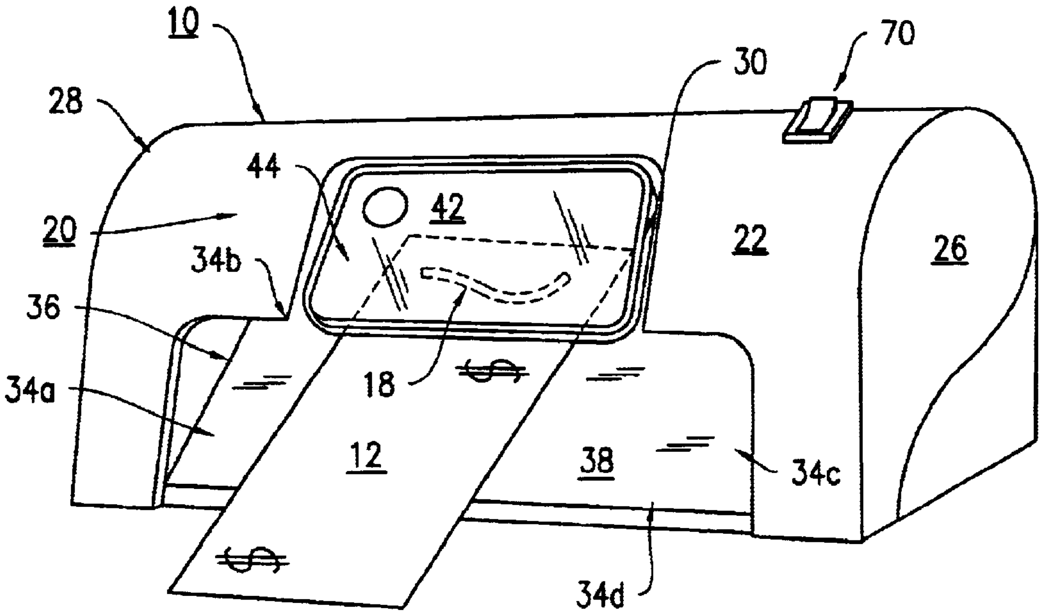
FIG. 1 is a perspective view of the counterfeit detector apparatus displaying the paper currency being inserted into the device.
Figure 2:
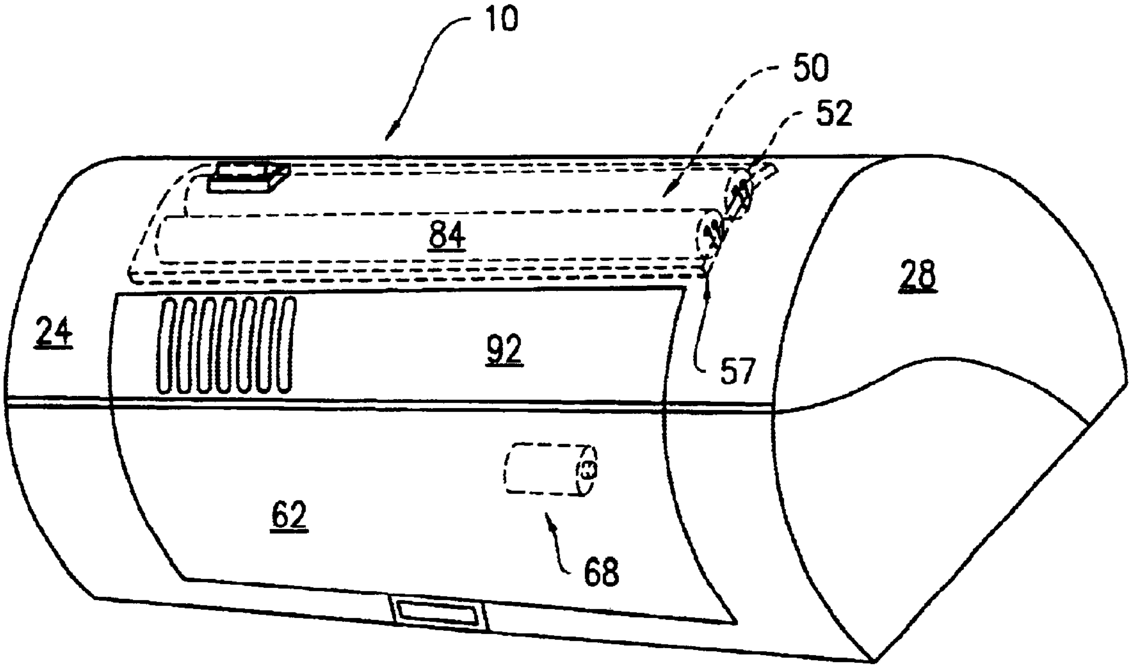
FIG. 2 is a rear perspective view of the counterfeit detector apparatus including an electrical cord for use with a standard electrical plug outlet.

The counterfeit detection viewer apparatus 10 and its component parts of the first embodiment of the present invention are represented in detail by FIGS. 1 and 2 of the patent drawings. The counterfeit detection viewer apparatus 10 includes a housing 20 in the configuration of a hand-held, lightweight scanner. Scanner housing 20 includes an internal UV lighting assembly 50 and a battery compartment 62 for receiving a plurality of batteries 68. The UV lighting assembly 50 uses a UV fluorescent tube 84 for detecting the security markings of an authentic document. The term Document is intended to include all documents having security markings including paper currency, passports, credit cards, travelers checks, I.N.S. green cards, social security cards, and the like. In this description, paper currency will be used as an illustrative example of all the different documents that may be inspected.

Scanner housing 20 includes a front wall 22, a backwall 24, and sidewalls 26 and 28, all being integrally connected to form a substantially elongated rectangular configuration which forms an interior compartment 44. Scanner housing 20 further includes perimeter edges 34*a* to 34*d* which define a detection opening 36 on the front wall 22 of scanner housing 20. The scanner housing 20 contains a slide out tray 38 for guiding the currency toward the UV fluorescent lamp 84 and which is removable for replacing the UV fluorescent tube 84.

Front wall section 22 includes perimeter edging 30 for receiving a magnifying viewing glass 42 which is adjustable between five (5) different positions to avoid or reduce the reflection of ambient light to make it easier to inspect the documents. Front wall 22 includes a circular hole opening 46 for receiving an ON/OFF button or switch 70.

Figure 4:
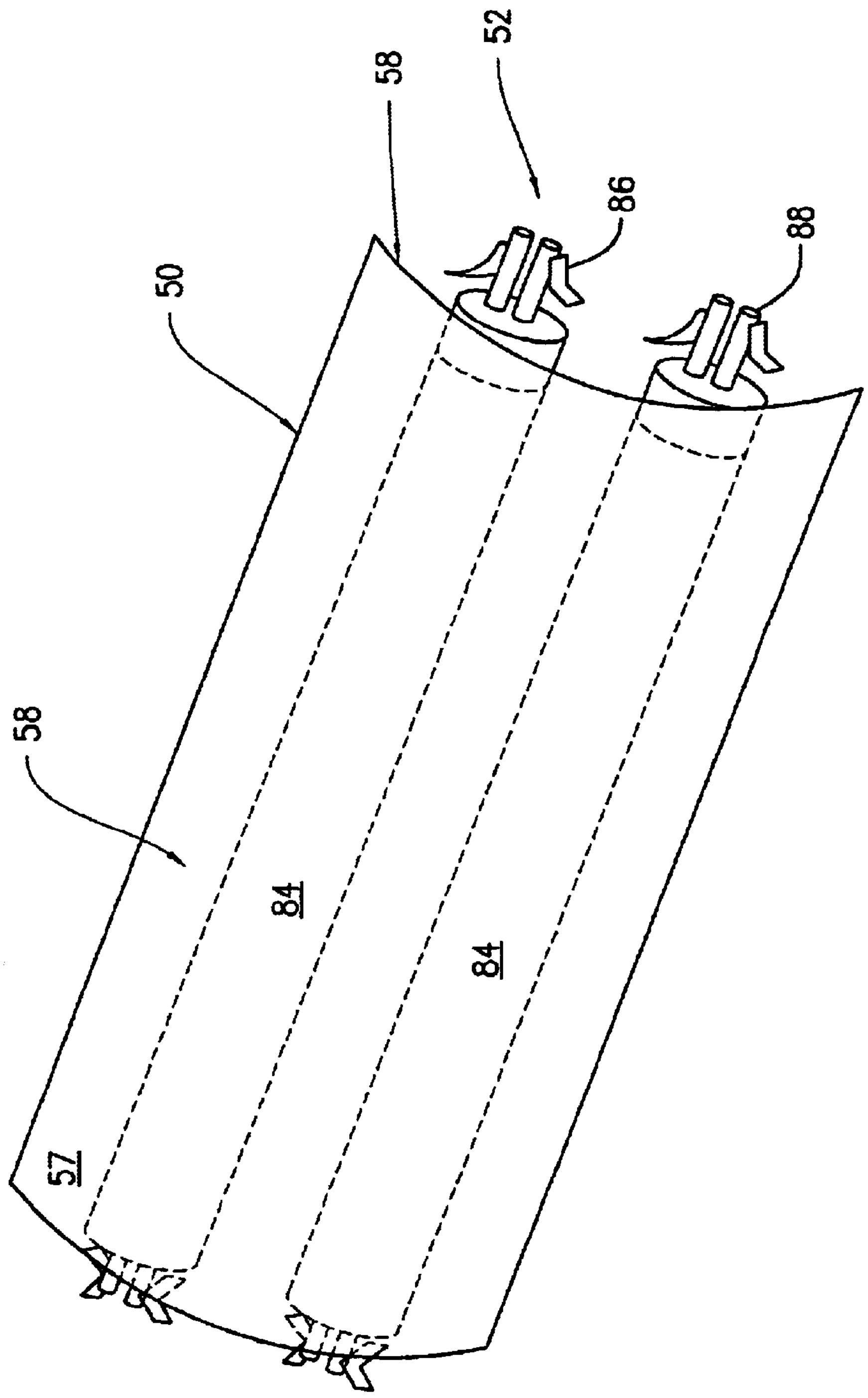
FIG. 4 is a perspective view of the counterfeit detector's UV fluorescent bulbs with a reflective cover for reflecting the UV light on the paper currency or other document.
Figure 5:
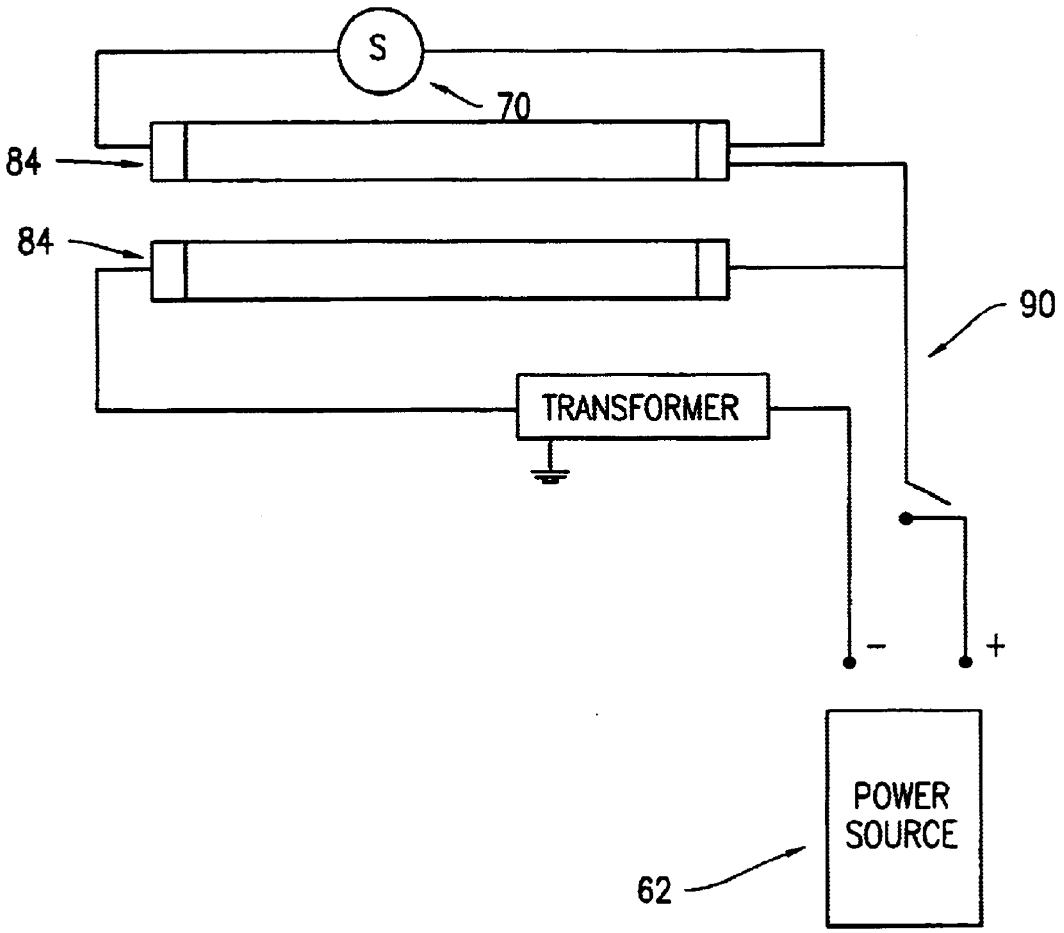
FIG. 5 is a perspective view of the electrical circuit and power source for illuminating the UV fluorescent bulbs.

The internal UV lighting assembly 50, as shown in FIGS. 2 and 4 of the drawings, includes a UV lighting fixture 52 having a light shield wall 57 having a reflective surface 58 thereon. The UV lighting fixture 52 has a UV fluorescent tube 84 which is received within miniature sockets 86 and 88. The UV fluorescent tube 84 has a power rating specification of 2 watts to 12 watts. As shown in FIG. 5, the UV lighting assembly 50 also includes a circuit 90 for electrically connecting the UV fluorescent bulbs 84 and the battery compartment 62.

Back wall 24 includes a removable cover 62 for opening and closing the battery compartment 62 for changing batteries and for changing the UV fluorescent lamp 84, as explained below.

Alternate Embodiment 100

Figure 3:
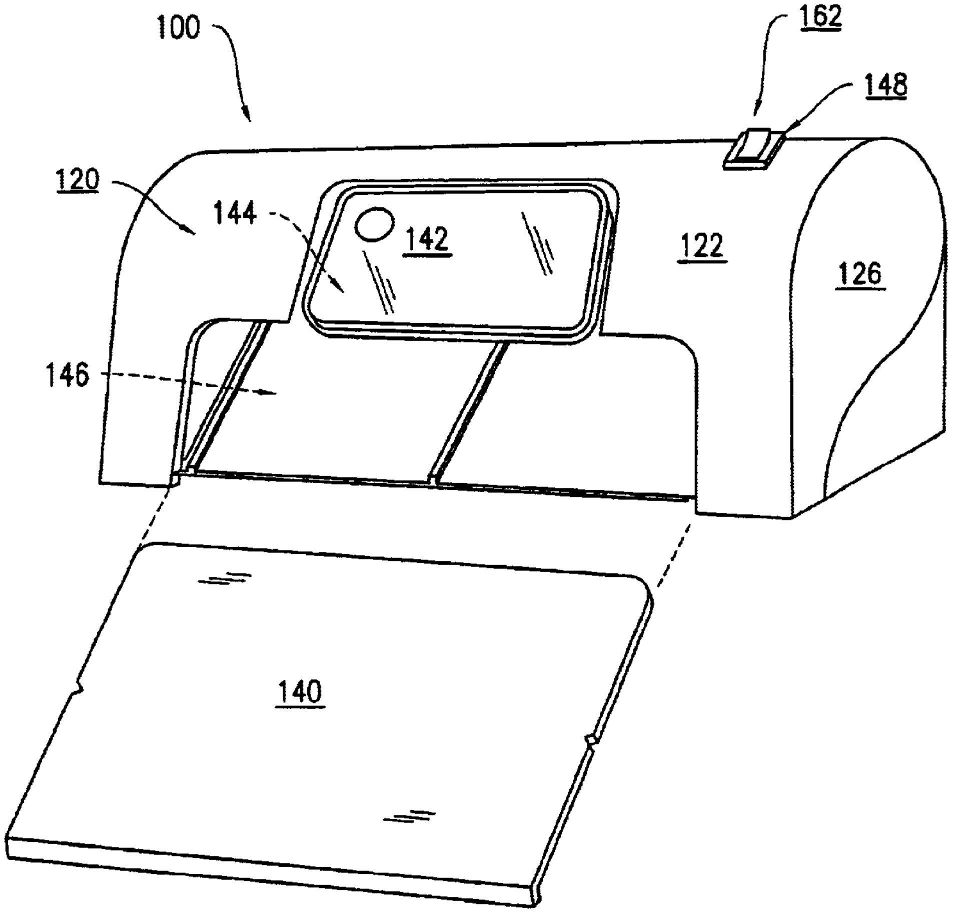
FIG. 3 is a perspective view of the alternate embodiment of the counterfeit detector apparatus showing the slide out tray removed from the device.
Figure 3A:
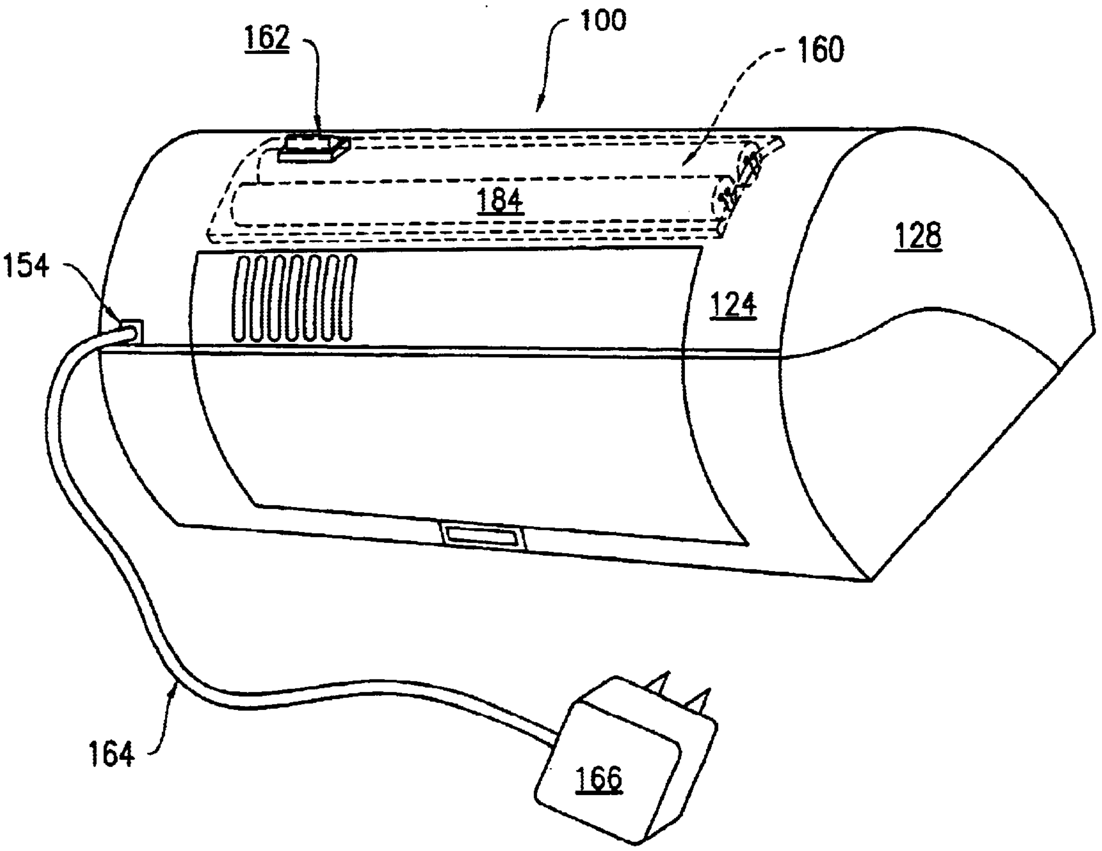
FIG. 3A is a back view of the alternate embodiment.

The counterfeit detection viewer apparatus 100 and its component parts of the second embodiment of the present invention are represented in detail by FIGS. 3 and 3A of the patent drawings. The counterfeit detection viewer apparatus 100 includes a housing 120 being substanitally rectangular in shape. Housing 120 includes an internal UV lighting fixture 160 having an ON/OFF switch or button 162 connected to an electrical cord 164 and plug 166 for use with a standard electrical outlet (110V). UV lighting fixture 160 has a UV fluorescent bulb 184 for detecting the security markings of an authentic currency bill or other document. The UV fluorescent bulb 184 has a power rating specification in the range of 2 watts to 12 watts. The second embodiment 100 of the counterfeit detection viewer apparatus is for stationary use on a counter top.

Housing 120 includes a front wall 122, a rear wall 124, and sidewalls 126 and 128. Housing 120 further includes an inner compartment 144 and contains a slide out tray 140 for guiding the currency toward the UV fluorescent bulb 184, and which is removable for replacing the UV fluorescent bulb 184. Front wall 122 includes an opening 146 for inserting currency bills there through to inspect them for authenticity, and a circular opening 148 for receiving the ON/OFF button 162 therein. Front section 126 includes a viewer opening for receiving a magnifying viewing glass 142 therein. Backwall 124 includes a circular hole opening 154 for receiving the electrical cord and plug 164 and 166 therein.

OPERATION OF THE PRESENT INVENTION

In operation, the user places the document or currency on tray 38 of the counterfeit detection viewer apparatus 10 so the document or paper currency 12 can be inspected and scanned. For example, new U.S. currency has a polymer thread with fluorescent markings sensitive to UV fluorescent light, and which will glow under intense UV fluorescent light. Each denomination of U.S. currency has a different color of security thread, such as red for the $100 bill.

In use, the user depresses the ON/OFF button 70 to the on position which in turn activates and illuminates the UV fluorescent tube 84 via the power source of batteries 68. The user then peers through the viewer magnifying glass 42 in order to determine the validity and authenticity of the currency bill 12 being scrutinized. The viewer will instantly see if a security marking 18 is present on the bill 12 being scanned, as it will glow red for the $100 bill, for example. If there is no security marking 18 on the bill 12 being scanned, then the bill 12 is determined to be counterfeit. When the user has finished operating the counterfeit detection apparatus 10, the user simply depresses again the ON/OFF button 70 to shut off the viewer apparatus 10. This conserves and saves the life of the batteries 68 being used to energize the viewer apparatus 10.

In operating the counterfeit detection viewer apparatus 100 of the alternate embodiment, the user simply plugs in the three-prong plug 166 into an AC electrical outlet for energizing the viewer apparatus 100 and switches on the ON/OFF switch 162. The user then inserts the document or currency through opening 146 where the currency bill is placed on tray member 140 for inspection. In all other respects, the viewer apparatus 100 functions and operates in the same manner as the counterfeit detection viewer apparatus 10 of the first embodiment.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A counterfeit detection viewer apparatus for detecting security markings in paper currency and like documents having security markings, comprising:

a) a housing having a detection opening for receiving the document to be inspected and a viewing opening with a magnifying glass for inspecting the document;

b) said maanifying glass being movable between different positions to avoid or reduce the reflection of ambient light;

c) a UV light fixture mounted in said housing having a UV fluorescent lamp for projecting UV light rays toward said detection opening and the document to be inspected;

d) means for activating said UV fluorescent lamp prior to inspecting the document through said detection opening; and e) a slide out tray in said housing for guiding the document toward said UV fluorescent lamp and which is removable for replacing said UV fluorescent lamp.

2. A counterfeit detection viewer apparatus in accordance with claim 1, further including reflector means mounted within said UV light fixture to reflect said UV light rays toward said detection opening, and wherein said reflector means is made of silverized plastic, polished metal, a reflective metallic finish or a painted reflective finish.

3. A counterfeit detection viewer apparatus in accordance with claim 1, wherein said UV fluorescent lamp is not more than 0.5 cm from said document.

4. A counterfeit detection viewer apparatus in accordance with claim 1, wherein said means for activating said UV fluorescent lamp includes a switch located on said housing.

5. A counterfeit detection viewer apparatus in accordance with claim 1, wherein said means for activating said UV fluorescent lamp includes a battery compartment for receiving one or more batteries for generating electrical current.

6. A counterfeit detection viewer apparatus in accordance with claim 1, wherein said means for activating said UV fluorescent lamp includes an electrical cord and plug for receiving electrical current.

7. A counterfeit detection viewer apparatus in accordance with claim 1, wherein said UV fluorescent lamp has a length in the range of 6 cms to 18 cms.

8. A counterfeit detection viewer apparatus in accordance with claim 1, wherein said UV fluorescent lamp has a power rating specification in the range of 2 watts to 9 watts.

9. A counterfeit detection viewer apparatus for detecting documents having security markings including paper currency, passports, credit cards, travelers checks, I.N.S. green cards, social security cards, and the like, comprising:

a) a housing having a detection opening for receiving the document to be inspected and a viewing opening for inspecting the document;

b) said viewing opening having a magnifying glass for inspecting the document;

c) said magnifying glass being movable between different positions to avoid or reduce the reflection of ambient light;

d) a UV light fixture mounted in said housing having a UV fluorescent lamp for projecting UV light rays toward said detection opening and the document to be inspected;

e) means for activating said UV fluorescent lamp prior to inspecting the document through said viewing opening; and f) a slide out tray in said housing for guiding the document toward said UV fluorescent lamp and which is removable for replacing said UV fluorescent lamp.

10. A counterfeit detection viewer apparatus for detecting documents having security markings in paper currency, passports, credit cards, travelers checks, I.N.S. green cards, social security cards, and the like, comprising:

a) a housing having an opening for receiving the document to be inspected and a magnifying viewing glass for inspecting the paper currency;

b) said magnifying glass being movable between different positions to avoid or reduce the reflection of ambient light;

c) a UV light fixture mounted in said housing having a UV fluorescent lamp for projecting UV light rays toward the document to be inspected;

d) means for activating said UV fluorescent lamp prior to inspecting the document through said magnifying viewing glass; and e) means for removing said UV fluorescent lamp from said housing.

11. A counterfeit detection viewer apparatus in accordance with claim 10, wherein said UV fluorescent lamp is not more than 0.5 centimeters from said documents.

* * * * *